UNITED STATES PATENT OFFICE.

GADIENT ENGI AND JAROSLAV FRÖHLICH, OF BASEL, SWITZERLAND, ASSIGNORS TO SOCIETY OF CHEMICAL INDUSTRY IN BASLE, OF BASEL, SWITZERLAND.

PROCESS OF DYEING AND THE PRODUCT THEREOF.

1,026,574. Specification of Letters Patent. Patented May 14, 1912.

No Drawing. Application filed December 28, 1910. Serial No. 599,723.

*To all whom it may concern:*

Be it known that we, GADIENT ENGI, doctor of philosophy and chemist, a citizen of the Swiss Republic, and JAROSLAV FRÖHLICH, doctor of philosophy and chemist, a subject of the Emperor of Austria-Hungary, residents of Basel, Switzerland, have invented a new and useful Process of Dyeing and the Product Therefor, of which the following is a full, clear, and exact specification.

By heating indigo, its homologues and substitution derivatives thereof with the halids of acids of the aromatic series or analogously acting substances, as for instance benzoyl chlorid or benzotrichlorid, hitherto unknown condensation products are obtained, which by treatment with saponifying agents are not capable of being reconverted into indigo. The manufacture of these products has been described in our Patent No. 994,988, dated June 13, 1911. We made the surprising and technically important observation, that these condensation products can be employed as vat dyestuffs. They yield with alkaline reducing agents wine-red to Bordeaux-red solutions dyeing vegetable and animal fibers pure greenish yellow tints of excellent fastness to washing, light and chlorin. On warming the said dyed fibers with a watery alkaline hydrosulfite solution, their yellow color changes to a Bordeaux red to wine red shade, which on exposure to air assumes again the original yellow color. By tipping the dyeings with concentrated sulfuric acid, their color turns to an intense orange which is again retransformed into the original greenish yellow color by washing with water. When the dyeings are shaken with concentrated sulfuric acid, the same change to orange takes place, the sulfuric acid being colored simultaneously intense orange. By tipping the dyeings with soda lye of 30° Baumé, no change of color occurs. On warming the dyeings with xylene or nitrobenzene, the liquid assumes a pure bright yellow tint.

Example I: For dyeing cotton, 1 part of the condensation product made as described in our above specified Patent No. 994,988 is made into a paste with 3 parts of caustic soda lye of 36° Baumé specific gravity, whereupon 200 parts of hot water and 3 parts of sodium hydrosulfite powder are added. The mixture is boiled, whereby a deep Bordeaux red solution having a yellow bloom is produced, and is then diluted with cold water to the desired strength for constituting the vat. Cotton yarn is introduced at the ordinary temperature and dyed for half an hour with addition of 10–40 parts of common salt. The yarn is then wrung out, hung up in the air for some time, washed and finally soaped warm or boiling. There are thus obtained dyeings of pure greenish yellow tint which are fast to washing, light and chlorin. By subsequently treating the exposed and washed dyeings with dilute hypochlorite solution the purity of the tint is somewhat enhanced.

Example II: For dyeing wool, 1 part of the product made as described in our above specified Patent No. 994,988, is made into a paste with $1\frac{1}{2}$ parts of caustic soda lye of 36° Baumé specific gravity, $1\frac{1}{2}$ parts of hydrosulfite powder are added and the mixture heated until reduction is complete. The solution obtained is adjusted by addition of water to the desired strength of vat. Woolen yarn is dyed in this vat at 40–50° C. for $\frac{1}{2}$ hour, and then wrung out, washed and oxidized by exposure to air for 20–30 minutes. It is then washed and developed at 60° C. with dilute sulfuric acid (1 c.c. of concentrated acid per liter of water).

Example III: For printing the new dyestuffs the following prescription may be used:

300 grms. of dyestuff (10 per cent. paste)
260 " " British gum
60 " " glycerin
150 " " potash
150 " " water
80 " " hydrosulfite N. F. conc. 1:1.
―――
1000

After printing with this printing color the goods are steamed for 2–3 minutes in the Mather-Platt apparatus, well washed and soaped boiling.

If, instead of the condensation products of indigo with benzoyl chlorid or benzotrichlorid, be employed the condensation products derived from homologues and substitution derivatives of indigo or from derivatives of benzoyl chlorid or of benzotrichlorid, fast yellow tints are also obtained.

What we claim is:

1. The process of producing yellow shades on textile fibers consisting in treating the condensation products, obtained by the action of halids of aromatic acids on an indigo compound in presence of a condensing agent, with alkaline reducing agents, applying the leuco compound thus produced to the fibers and finally oxidizing the same on the fibers.

2. The process of producing yellow shades on textile fibers consisting in treating the condensation products, obtained by the action of halids of aromatic acids on an indigo compound in presence of a condensing agent, with alkaline hydrosulfites, applying the leuco compound thus produced to the fibers and finally oxidizing the same on the fibers.

3. The process of producing yellow shades on textile fibers consisting in treating the condensation product, obtained by the action of benzoyl chlorid on indigo in presence of a condensing agent, with alkaline hydrosulfite, applying the leuco compound thus produced to the fibers and finally oxidizing the same on the fibers.

4. As a new article of manufacture, a textile fiber dye with the oxidation products of the leuco compounds of the condensation products which are obtained by treating an indigo compound with halids of aromatic acids in presence of a condensing agent, the so dyed fiber changing its yellow color, on warming it with watery alkaline hydrosulfite solution, to a Bordeaux red to wine red shade, which on exposure to air assumes again its original yellow color, and, on tipping it with concentrated sulfuric acid, to an intense orange which is again transformed into the original yellow color by washing with water, while the yellow color of the said fiber is not changed when it is tipped with soda lye of 30° Bé. and the said dyed fiber giving further a pure bright yellow solution when it is warmed with xylene or nitrobenzene and coloring concentrated sulfuric acid intense orange when it is shaken with this acid.

5. As a new article of manufacture, a yellow textile fiber dyed with the oxidation product of the leuco compound of the condensation product, which is obtained by treating indigo with benzoyl chlorid in presence of a condensing agent, the said fiber changing its yellow color, on warming it with a watery alkaline hydrosulfite solution, to a Bordeaux red shade, which on exposure to air assumes again its original yellow color, and, on tipping it with concentrated sulfuric acid, to an intense orange which is again transformed into the original yellow color by washing with water, while the yellow color of the said fiber is not changed when it is tipped with soda lye of 30° Bé. and the said dyed fiber giving further a pure bright yellow solution when it is warmed with xylene or nitrobenzene and coloring concentrated sulfuric acid intense orange when it is shaken with this acid.

In witness whereof we have hereunto signed our names this 15th day of December, 1910, in the presence of two subscribing witnesses.

GADIENT ENGI.
JAROSLAV FRÖHLICH.

Witnesses:
  GEO. GIFFORD,
  AMAND BRAUN.